United States Patent
Wirick

(10) Patent No.: US 8,340,098 B2
(45) Date of Patent: Dec. 25, 2012

(54) METHOD AND APPARATUS FOR DELIVERING COMPRESSED VIDEO TO SUBSCRIBER TERMINALS

(75) Inventor: Kevin S. Wirick, Olivenhain, CA (US)

(73) Assignee: General Instrument Corporation, Horsham, PA (US)

( * ) Notice: Subject to any disclaimer, the term of this patent is extended or adjusted under 35 U.S.C. 154(b) by 1614 days.

(21) Appl. No.: 11/295,967

(22) Filed: Dec. 7, 2005

(65) Prior Publication Data

US 2007/0130596 A1 Jun. 7, 2007

(51) Int. Cl.
*H04L 12/28* (2006.01)

(52) U.S. Cl. ........ 370/394; 370/390; 370/465; 370/487; 370/503; 725/74; 725/91; 725/96; 725/114

(58) Field of Classification Search ............... 370/390, 370/394, 465, 470, 487, 503; 725/74, 76, 725/91, 93, 96, 114
See application file for complete search history.

(56) References Cited

U.S. PATENT DOCUMENTS

| | | | |
|---|---|---|---|
| 5,361,091 A * | 11/1994 | Hoarty et al. | 725/119 |
| 5,421,031 A | 5/1995 | DeBey et al. | |
| 5,528,282 A | 6/1996 | Voeten et al. | |
| 5,659,539 A | 8/1997 | Porter et al. | |
| 5,682,597 A | 10/1997 | Ganek et al. | |
| 5,684,799 A * | 11/1997 | Bigham et al. | 370/397 |
| 5,686,965 A | 11/1997 | Auld | |
| 5,701,582 A | 12/1997 | DeBey et al. | |
| 5,719,632 A * | 2/1998 | Hoang et al. | 375/240.05 |
| 5,724,646 A | 3/1998 | Ganek et al. | |
| 5,732,217 A * | 3/1998 | Emura | 725/90 |
| 5,748,229 A * | 5/1998 | Stoker | 348/180 |
| 5,864,682 A | 1/1999 | Porter et al. | |
| 5,884,141 A * | 3/1999 | Inoue et al. | 725/101 |
| 5,909,224 A | 6/1999 | Fung | |
| 5,949,410 A | 9/1999 | Fung | |
| 6,112,226 A | 8/2000 | Weaver et al. | |
| 6,138,147 A | 10/2000 | Weaver et al. | |
| 6,181,334 B1 * | 1/2001 | Freeman et al. | 725/138 |
| 6,310,652 B1 * | 10/2001 | Li et al. | 348/515 |
| 6,317,459 B1 * | 11/2001 | Wang | 375/240.12 |
| 6,415,326 B1 | 7/2002 | Gupta et al. | |

(Continued)

FOREIGN PATENT DOCUMENTS

EP 1294193 A 3/2003

(Continued)

OTHER PUBLICATIONS

EPC Extended Search Report, RE: Application #06025219.4-1247 / 1796394 May 14, 2009.

(Continued)

*Primary Examiner* — Andrew Lai
*Assistant Examiner* — Andrew C Lee
(74) *Attorney, Agent, or Firm* — Stewart M. Wiener

(57) ABSTRACT

Method and apparatus for distributing a content stream from a headend to a subscriber terminal is described. In one example, the content stream is processed at the headend to generate a sequence of instances having successively staggered reference frames. A request for the content streams is received from the subscriber terminal at an initial time. In response to the request, an instance from the sequence of instances having the first reference frame after the initial time is selected. The selected instance is transmitted towards the subscriber terminal.

20 Claims, 4 Drawing Sheets

U.S. PATENT DOCUMENTS

| | | | |
|---|---|---|---|
| 6,480,539 B1* | 11/2002 | Ramaswamy | 375/240.03 |
| 6,519,693 B1 | 2/2003 | DeBey et al. | |
| 6,526,580 B2 | 2/2003 | Shimomura | |
| 6,535,920 B1 | 3/2003 | Parry et al. | |
| 6,611,624 B1* | 8/2003 | Zhang et al. | 382/232 |
| 6,637,031 B1 | 10/2003 | Chou | |
| 6,728,317 B1 | 4/2004 | Demos | |
| 6,745,715 B1 | 6/2004 | Shen et al. | |
| 6,771,644 B1 | 8/2004 | Brassil et al. | |
| 6,850,965 B2 | 2/2005 | Allen | |
| 6,985,570 B2 | 1/2006 | Hasemann | |
| 7,058,721 B1 | 6/2006 | Ellison et al. | |
| 7,096,481 B1 | 8/2006 | Forecast et al. | |
| 7,116,714 B2* | 10/2006 | Hannuksela | 375/240.12 |
| 7,143,432 B1 | 11/2006 | Brooks et al. | |
| 7,149,410 B2 | 12/2006 | Lin et al. | |
| 7,218,635 B2 | 5/2007 | Haddad | |
| 7,298,966 B2* | 11/2007 | Nakatani et al. | 386/124 |
| 7,366,241 B2* | 4/2008 | Matsui | 375/240.27 |
| 7,430,222 B2* | 9/2008 | Green et al. | 370/486 |
| 7,444,419 B2* | 10/2008 | Green | 709/231 |
| 7,469,365 B2* | 12/2008 | Kawahara et al. | 714/701 |
| 7,562,375 B2* | 7/2009 | Barrett et al. | 725/38 |
| 7,587,737 B2* | 9/2009 | Baldwin et al. | 725/101 |
| 7,636,934 B2* | 12/2009 | Baldwin et al. | 725/101 |
| 7,720,432 B1 | 5/2010 | Colby et al. | |
| 7,788,393 B2 | 8/2010 | Pickens et al. | |
| 7,885,270 B2 | 2/2011 | Frink et al. | |
| 2002/0016961 A1* | 2/2002 | Goode | 725/9 |
| 2002/0073402 A1 | 6/2002 | Sangavarapu et al. | |
| 2002/0147979 A1 | 10/2002 | Corson | |
| 2002/0166119 A1 | 11/2002 | Cristofalo | |
| 2002/0168012 A1* | 11/2002 | Ramaswamy | 375/240.29 |
| 2002/0184637 A1 | 12/2002 | Perlman | |
| 2003/0012280 A1 | 1/2003 | Chan | |
| 2003/0053476 A1* | 3/2003 | Sorenson et al. | 370/431 |
| 2003/0093543 A1 | 5/2003 | Cheung et al. | |
| 2003/0098869 A1* | 5/2003 | Arnold et al. | 345/589 |
| 2003/0103613 A1 | 6/2003 | Hasemann | |
| 2003/0128765 A1* | 7/2003 | Yoshigahara | 375/240.25 |
| 2003/0208768 A1 | 11/2003 | Urdang et al. | |
| 2004/0034863 A1* | 2/2004 | Barrett et al. | 725/38 |
| 2004/0034864 A1* | 2/2004 | Barrett et al. | 725/38 |
| 2004/0049793 A1 | 3/2004 | Chou | |
| 2004/0064497 A1 | 4/2004 | Debey | |
| 2004/0146205 A1 | 7/2004 | Becker et al. | |
| 2004/0160974 A1* | 8/2004 | Read et al. | 370/431 |
| 2004/0223739 A1 | 11/2004 | Suzuki et al. | |
| 2004/0231004 A1 | 11/2004 | Seo | |
| 2004/0255328 A1 | 12/2004 | Baldwin et al. | |
| 2005/0039219 A1 | 2/2005 | Cooper et al. | |
| 2005/0055730 A1 | 3/2005 | Daniels | |
| 2005/0060755 A1 | 3/2005 | Daniels | |
| 2005/0060756 A1 | 3/2005 | Daniels | |
| 2005/0081244 A1* | 4/2005 | Barrett et al. | 725/97 |
| 2005/0089035 A1 | 4/2005 | Klemets et al. | |
| 2005/0097596 A1* | 5/2005 | Pedlow | 725/31 |
| 2005/0099869 A1 | 5/2005 | Crinon et al. | |
| 2005/0120131 A1 | 6/2005 | Allen | |
| 2005/0174352 A1* | 8/2005 | Gabrani et al. | 345/501 |
| 2005/0190781 A1* | 9/2005 | Green et al. | 370/432 |
| 2005/0210145 A1 | 9/2005 | Kim et al. | |
| 2005/0232587 A1* | 10/2005 | Strawn et al. | 386/69 |
| 2005/0262531 A1 | 11/2005 | Varma et al. | |
| 2005/0265374 A1 | 12/2005 | Pelt | |
| 2006/0018379 A1* | 1/2006 | Cooper | 375/240.12 |
| 2006/0020995 A1 | 1/2006 | Opie et al. | |
| 2006/0075428 A1 | 4/2006 | Farmer et al. | |
| 2006/0075446 A1 | 4/2006 | Klemets et al. | |
| 2006/0075449 A1 | 4/2006 | Jagadeesan et al. | |
| 2006/0080724 A1 | 4/2006 | Vermeiren et al. | |
| 2006/0083263 A1* | 4/2006 | Jagadeesan et al. | 370/487 |
| 2006/0117358 A1* | 6/2006 | Baldwin et al. | 725/90 |
| 2006/0117359 A1 | 6/2006 | Baldwin et al. | |
| 2006/0126667 A1 | 6/2006 | Smith et al. | |
| 2006/0136581 A1 | 6/2006 | Smith | |
| 2006/0143669 A1* | 6/2006 | Cohen | 725/90 |
| 2006/0182052 A1 | 8/2006 | Yoon et al. | |
| 2006/0184973 A1 | 8/2006 | de Heer et al. | |
| 2006/0218281 A1 | 9/2006 | Allen | |
| 2006/0224666 A1 | 10/2006 | Allen | |
| 2006/0224768 A1 | 10/2006 | Allen | |
| 2006/0242240 A1* | 10/2006 | Parker et al. | 709/205 |
| 2006/0244936 A1* | 11/2006 | Ozawa | 355/40 |
| 2007/0040818 A1 | 2/2007 | Aoyanagi et al. | |
| 2007/0121629 A1 | 5/2007 | Cuijpers et al. | |
| 2007/0222728 A1 | 9/2007 | Koyama et al. | |
| 2008/0028275 A1 | 1/2008 | Chen et al. | |
| 2008/0120553 A1 | 5/2008 | Bergman et al. | |
| 2008/0273698 A1* | 11/2008 | Manders et al. | 380/200 |
| 2009/0010273 A1* | 1/2009 | Green et al. | 370/432 |
| 2009/0064242 A1 | 3/2009 | Cohen et al. | |
| 2011/0162024 A1 | 6/2011 | Jagadeesan et al. | |

FOREIGN PATENT DOCUMENTS

| | | |
|---|---|---|
| EP | 1487215 A2 | 12/2004 |
| WO | 2004114667 A1 | 12/2004 |
| WO | 2004114668 A1 | 12/2004 |
| WO | 2008/044916 | 4/2008 |
| WO | 2009/097230 A1 | 8/2009 |
| WO | 2010/014210 A1 | 2/2010 |

OTHER PUBLICATIONS

Wee S. J., et al: "Splicing MPEG Video Streams in the Compressed Domain" Jun. 23, 1997.

N. Hurst, et al., "MPEG Splicing: A New Standard for Television—SMPTE312M", SMPTE Journal, vol. 107, No. 11, pp. 978-988, SMPTE Inc.; Nov. 1, 1998.

Summons to Attend Oral Proceedings, European Application No. 06025219.4, dated May 15, 2012.

R. Rajah, "Optimizing Channel Change Time", Cisco Systems, Inc., 2008.

W. Johns, "A Better TV Experience with Microsoft Mediaroom Instant Channel Change", WordPress Ops Vault, Sep. 29, 2010.

American National Standard ANSI/SCTE 35 2004, "Digital Program Insertion Cueing Message for Cable," Society of Cable Telecommunications Engineers, Inc., Exton, PA, USA (www.scte.org).

H. Schulzrinne, et al., "Real-Time Streaming Protocol (RTSP)," Request for Comments RFC2326, Network Working Group, Internet Engineering Task Force (IETF), Apr. 1998.

Wave 7 Optics, Inc., "Channel Change Speed in IPTV Systems," White Paper, dated Jun. 3, 2004.

\* cited by examiner

METHOD AND APPARATUS FOR DELIVERING COMPRESSED VIDEO TO SUBSCRIBER TERMINALS

BACKGROUND OF THE INVENTION

1. Field of the Invention

The present invention relates to content distribution systems and, more particularly, to a method and apparatus for delivering compressed video to subscriber terminals.

2. Description of the Background Art

Multimedia distribution systems are becoming increasingly important vehicles for delivering video, audio and other data (generally referred to as content streams) to and from remote users. Notably, switched digital video (SDV) systems have been developed to deliver content streams to subscribers over limited bandwidth transmission networks. Such transmission networks include, for example, digital subscriber line (DSL) networks, fiber-to-the-curb (FTTC) networks, and fiber-to-the-home (FTTH) networks. SDV systems typically distribute content streams using a packet-based transmission protocol, such as asynchronous transfer mode (ATM), transmission control protocol/internet protocol (TCP/IP), and the like, as well as combinations of such protocols (e.g., TCP/IP encapsulated by ATM). Subscribers receive the packetized streams via the appropriate termination equipment (e.g., DSL modems).

Typically, the number of channels for content service transmission that are supported by the transmission network is less than the total number of content streams accessible by the SDV system. Thus, the SDV system is configured to switch subscriber-desired content streams among the available channels supported by the transmission network. To change streams, a subscriber transmits a request to the network for the new stream and the network multiplexes the requested stream onto one of the available channels supported by the transmission network.

There are various factors that affect the channel-change time experienced by a subscriber requesting a channel-change. One of the largest contributors to the delay in acquiring a new stream in response to a channel-change is the decoder's dependence on receiving an independent reference frame in the content stream in order to produce decoded content. For example, a compressed video stream, such as a moving picture experts group (MPEG) stream, includes independent reference frames, referred to as intra-coded frames (I-frames), as well as predicted frames (P-frames) and bi-directionally interpolated frames (B-frames). After a service-change, a decoder must wait for an I-frame before the decoding process can begin.

Notably, I-frames require include more data and are thus transmitted less frequently than P-frames or B-frames. Typically, a compressed video stream includes two I-frames per second (i.e., once every 500 milliseconds). There is a trade-off between the number of I-frames per second and data bandwidth. Because I-frames are the largest of the three types of frames, bandwidth is saved by reducing the number of I-frames per second. However, a point of diminishing returns in reached, since the longer the time between I-frames, the more the picture fails to be predicted and thus more information will be contained in the P- and B-frames. Since a decoder must wait for an I-frame to start decoding, as the number of I-frames per second is reduced, the channel-change time is increased. For example, for a compressed video stream having two I-frames per second, the channel-change time may be as long as 500 milliseconds. Compared to conventional television, this delay is undesirable to a viewer.

Accordingly, there exists a need in the art for a method and apparatus for distributing compressed video to subscriber terminals that reduces the delay in acquiring new channels.

SUMMARY OF THE INVENTION

Method and apparatus for distributing a content stream from a headend to a subscriber terminal is described. In one embodiment, the content stream is processed at the headend to generate a sequence of instances having successively staggered reference frames. A request for the content streams is received from the subscriber terminal at an initial time. In response to the request, an instance from the sequence of instances having the first reference frame after the initial time is selected. The selected instance is transmitted towards the subscriber terminal.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Method and apparatus for distributing compressed video to subscriber terminals is described. In one embodiment, a sequence of instances of each compressed video stream (also referred to herein as a content stream) is created in a headend. For a given content stream, the reference frames in the sequence of instances are successively offset from one another. When a subscriber terminal requests a particular content stream, an instance of the stream is selected having the first occurring reference frame among all of the instances, which results in the fastest acquisition of the content at the subscriber terminal. All of the processing required to implement the invention is performed by the headend and/or transport network, which is shared by the subscriber terminals. No modification or additional cost is incurred in the subscriber terminals.

Figure 1:
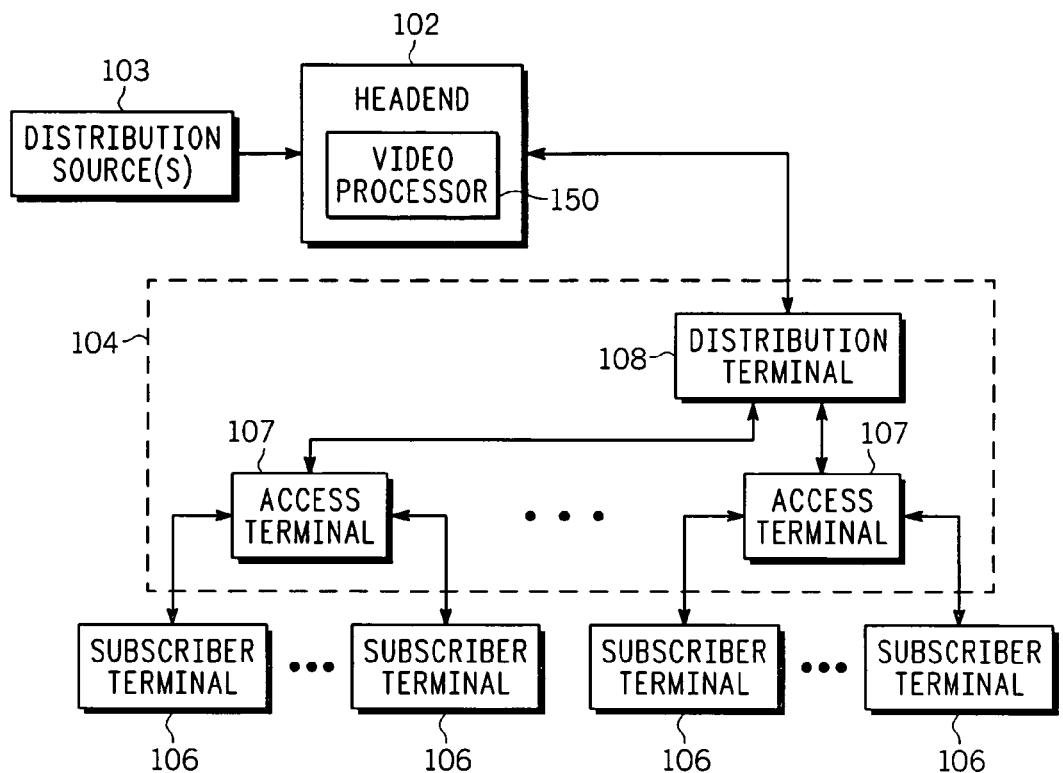
FIG. 1 is a block diagram depicting an exemplary embodiment of a content distribution system in accordance with one or more aspects of the invention.

FIG. 1 is a block diagram depicting an exemplary embodiment of a content distribution system 100 in accordance with one or more aspects of the invention. The system 100 includes a headend 102, a transport system 104, and a plurality of subscriber systems 106. The transport system 104 illustratively comprises a distribution terminal 108 and a plurality of access terminals 107. The headend 102 delivers content services obtained from one or more distribution sources 103 to the subscriber systems 106 via the transport system 104. The distribution sources 103 may include satellite distribution networks, video-on-demand (VOD) networks, and the like type content sources known in the art.

In particular, the headend 102 receives various content streams from the distribution sources 103. Each of the content streams may include an audio component, a video component, a data component, or any combination thereof. The content streams are formatted using a digital compression and transport technique. For purposes of clarity by example, the content streams are described as being compliant with standards developed by the moving picture experts group (MPEG), such as MPEG-1, MPEG-2, and MPEG-4. It is to be understood that the content streams may be compliant with other standards, such as standards developed by the International Telecommunications Union (ITU) (e.g., H261 and H263).

The headend 102 includes a video processor 150. As described below, the video processor 150 creates a sequence of instances of each content stream received by the headend 102. For a given content stream, each instance has a different placement of reference frames (e.g., intra-coded frames (I-frames)). When a subscriber terminal requests a stream, such as during a channel change, the system 100 selects the instance of the desired content stream that will result in the fastest acquisition at the decoder of the subscriber terminal. The headend 102 provides output streams to the transport network 104. In one embodiment, the element that selects instances of content streams in response to requests from the subscriber terminals 106 ("selection element") is located in the headend 102. In such an embodiment, each of the output streams includes a stream of content for viewing a subscriber terminal. In another embodiment, the selection element is located within the transport network 104. In this case, each of the output streams includes the multiple instances of a content stream produced by the video processor 150. Alternatively, each of the output streams may include a single instance of the multiple instances of a content stream produced by the video processor 150.

In any embodiment, the output streams produced by the headend 102 may be encapsulated using one or more packet-based transmission protocols and coupled to the distribution terminal 108. The term "packet-based protocol," as used herein, is meant to encompass any protocol known in the art that is configured to carry information using packets, cells, frames, or like type data units. For example, the output streams provided by the headend 102 may be transmitted to the distribution terminal 108 using an asynchronous transport mode (ATM) protocol (e.g., ATM adaptation layer 5 (AAL5)). Each of the output streams occupies an ATM virtual circuit (VC) in a virtual path (VP) between the headend 102 and the transport system 104. The output streams may be distinguished using VC/VP identifiers. Optionally, each of the output streams may be first encapsulated using network/transport protocol (e.g., user datagram protocol/internet protocol (UDP/IP)) and then encapsulated using an ATM protocol. In yet another embodiment, the output streams may be encapsulated using only a network/transport protocol, such as UDP/IP. In such a configuration, the streams may be distinguished by one or more of source IP address, destination IP address, and UDP port number, for example.

The distribution terminal 108 is coupled to each of the access terminals 107. The distribution terminal 108 delivers one or more of the output streams to each of the access terminals 107 for distribution to the subscriber terminals 106. Each of the access terminals 107 provides a distribution node for a set of subscriber systems 106.

The output streams may be distributed to the subscriber systems 106 through the access terminals 107 using optical fiber, copper wire, coaxial cable, or like-type transmission media know in the art, as well as combinations of such facilities. For example, the output streams may be distributed using a digital subscriber line (DSL) facility, where data is delivered to one or more of the subscriber systems 106 entirely over copper wire. The term "DSL" is meant to encompass very high speed DSL (VDSL), asynchronous DSL (ADSL), and the like (generally referred to as xDSL). Alternatively, the output streams may be delivered using a fiber-to-the-curb (FTTC) or a fiber-to-the-node (FTTN) facility, where data is delivered over optical fiber to the access terminals 107, and over copper wire or coaxial cable from the access terminals 107 to the respective subscriber systems 106. In yet another example, the output streams may be distributed using a fiber-to-the-home (FTTH) facility, where data is delivered to the subscriber systems 106 entirely over optical fiber. In yet another example, the output streams may be distributed entirely over coaxial cable or a combination of coaxial cable and optical fiber using a DOCSIS (data over cable service interface specification) transmission facility. DSL, FTTC, FTTN, FTTH, and DOCSIS transmission facilities are well known in the art. As such, the details of such facilities are not described in detail herein.

Typically, the distribution terminal 108, or both the distribution terminals 108 and the access terminals 107, receive more content than can be distributed to a subscriber system 106 at any given time. For example, there may be sufficient bandwidth to transmit only three streams to any given subscriber terminal 106. The system 100 allows the subscriber terminals 106 to access all of the content provided by the headend 102 by switching the available content into the available bandwidth in response to command data produced by the subscriber terminals 106 ("channel change requests"). The channel change requests generated by the subscriber terminals 106 are sent to the access terminals 107 via a bi-directional channel. The access terminals 107 may process the channel change requests, or forward them to the distribution terminal 108. The distribution terminal 108 may process the channel change requests, or forward them to the headend 102. In general, one or more of the headend 102, the distribution terminal 108, or the access terminal 107 may be involved in processing a channel change request.

Figure 2:
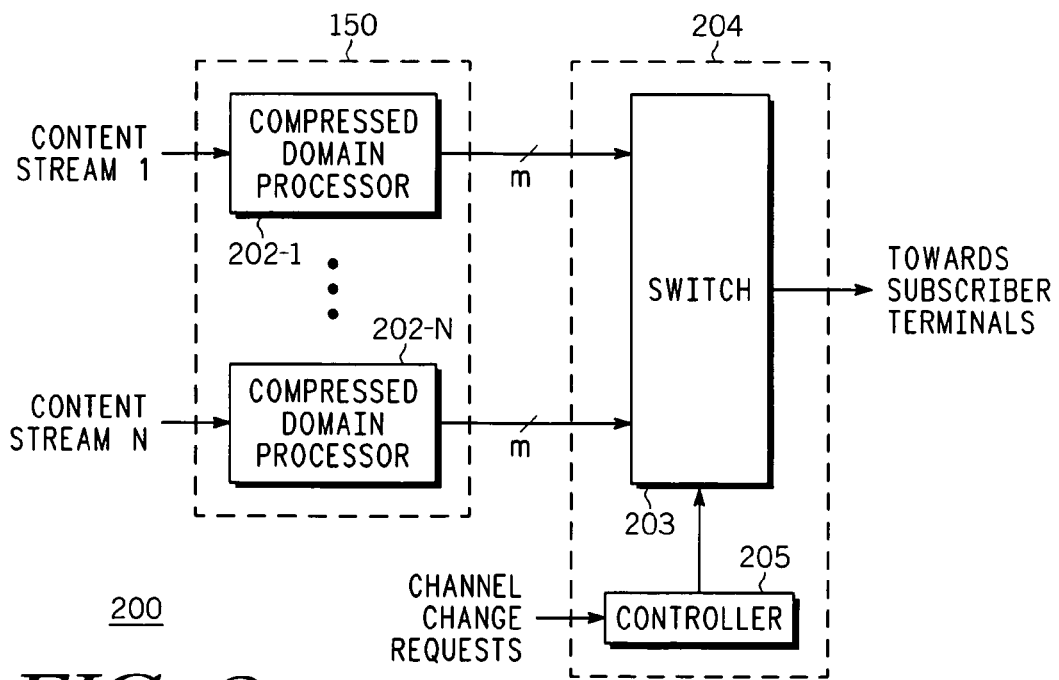
FIG. 2 is a block diagram depicting an exemplary embodiment of a channel-change subsystem in accordance with one or more aspects of the invention.

FIG. 2 is a block diagram depicting an exemplary embodiment of a channel-change subsystem 200 in accordance with one or more aspects of the invention. The channel-change subsystem 200 includes the video processor 150, a selection element 204. The selection element 204 may be located in the headend 102, the distribution terminal 108, or in each of the access terminals 107. The video processor 150 includes compressed domain processors 202-1 through 202-N (collectively referred to as compressed domain processors 202). Each of the compressed domain processors 202 is configured to receive a content stream from the distributions sources 103. Each of the compressed domain processors 202 is configured to process its respective content stream to generate a sequence of instances having successively staggered reference frames. In one embodiment, the reference frames comprise I-frames.

In the present example, each of the compressed domain processors 202 provides M output streams (one for each instance in the sequence) to the selection element 204.

In one embodiment, the compressed domain processors 202 pass the content stream as a primary instance in the sequence of instances. That is, the reference frames of the primary instance and the content stream are identically placed. To produce the remaining instances in the sequence, each of the compressed domain processors 202 replaces a non-reference frame (e.g., a predicted frame) with a reference frame (e.g., an I-frame) in a staggered fashion. In another embodiment, the compressed domain processors 202 pass the content stream as the primary instance in the sequence of instances, and successively delay the primary stream to produce the remaining instances. In such an embodiment, the compressed domain processors 202 may comprise buffers configured to provide successive delays. In any case, the content stream is processed in the compressed domain (i.e., no decoding and re-encoding is required).

Figure 3:
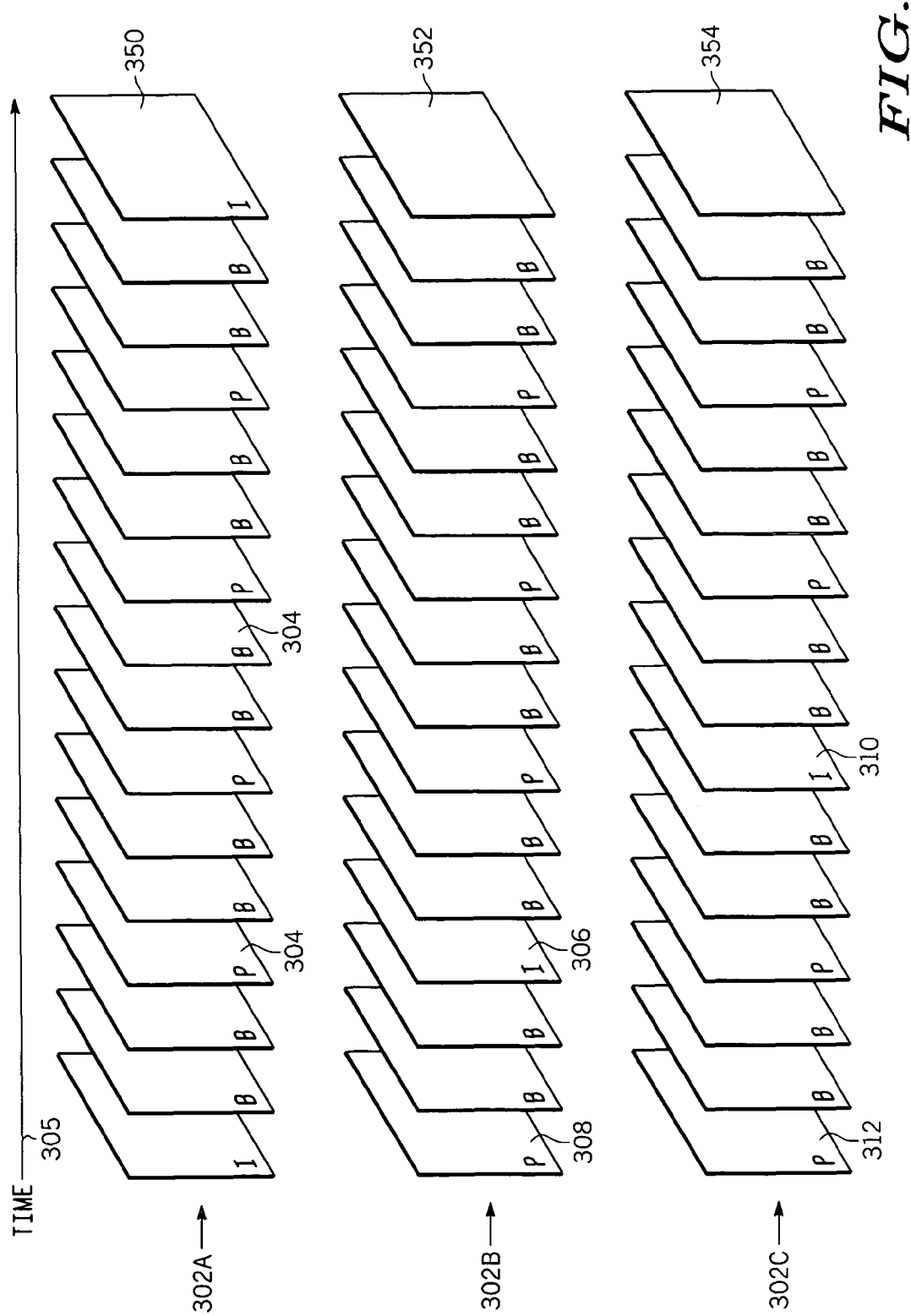
FIG. 3 depicts three illustrative instances of a given content stream.

In particular, FIG. 3 depicts three illustrative instances 302A, 302B, and 302C of a given content stream (collectively referred to as instances 302). The instances 302 may be generated by one of the compressed domain processors 202. Each of the instances 302 includes a sequence of frames 304. An axis 305 represents time, which increases from left to right. Thus, the leftmost frames are the first frames transmitted and the rightmost frames are the last frames transmitted. The frames 304 may be I-frames, predicted-frames (P-frames), or bi-directionally interpolated frames (B-frames). The first 15 frames of the instance 302A is the frame sequence I-BB-P-BB-P-BB-P-BB-P-BB. This frame sequence is a typical group of pictures (GOP), where there are 15 frames between I-frames at 30 frames per second. Thus, an I-frame occurs every 500 milliseconds.

The instance 302A may be considered to be the primary instance. The first 15 frames of the instance 302B is the frame sequence P-BB-I-BB-P-BB-P-BB-P-BB. Frame 306 in the instance 302B has been changed to an I-frame from a P-frame in the instance 302A. Frame 308 in instance 302B has been changed to a P-frame from an I-frame in the instance 302A. Thus, the I-frame in the instance 302B occurs later than the I-frame in the instance 302A. The first 15 frames of the instance 302C is the frame sequence P-BB-P-BB-I-BB-P-BB-P-BB. Frame 310 in instance 302C has been changed to an I-frame from a P-frame in the instance 302A. Frame 312 in instance 302C has been changed to a P-frame from an I-frame in the instance 302A. Thus, the I-frame in the instance 302C occurs later than the I-frame in the instance 302A and the instance 302B. This process may be repeated to produce additional instances. The number of frames between I-frames from instance to instance (e.g., 2 frames) is merely illustrative. Other frame spacings may be used. In addition, a GOP may include more or less frames and the I-frames in the original content stream may be spaced more or less apart than 500 ms. Furthermore, those skilled in the art will appreciate that the instances 302 may be successively delayed instances of the content stream as an alternative to replacing non-reference frames with reference frames.

Returning to FIG. 2, the selection element 204 includes a switch 203 and a controller 205. The controller 205 receives channel change requests from the subscriber terminals 106. The controller 205 provides control signals to the switch 203 for selecting specific instances generated by the compressed domain processors 202 based on the channel change requests received from the subscriber terminals 106. For example, if a subscriber unit requests a change to content stream 1, the controller 205 instructs the switch 203 to select an instance from the sequence produced by the compressed domain processor 202-1 having the first reference frame (e.g., I-frame) after the initial time of the request.

Figure 4:
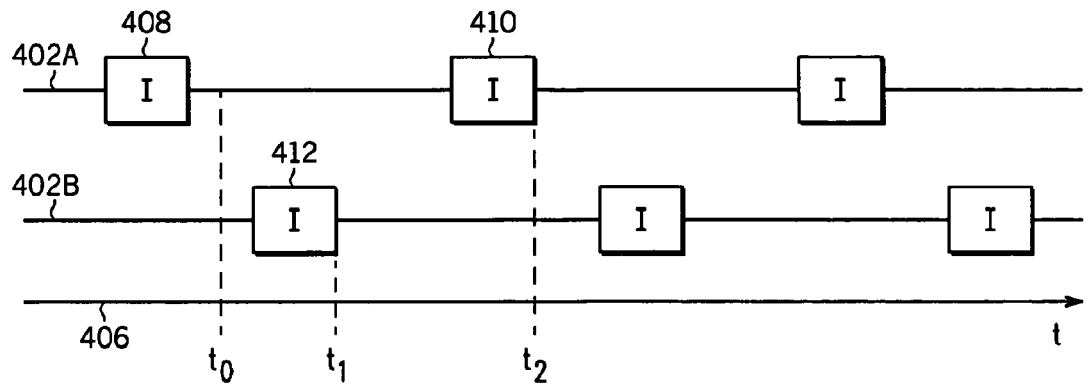
FIG. 4 depicts two exemplary content stream instances with respect to a channel change event.

FIG. 4 depicts two exemplary content stream instances 402A and 402B with respect to a channel change event. An axis 406 represents time, which increases from left to right. In the present example, the channel change event occurs at an initial time, t0, which is after I-frame 408 in the instance 402A. In the typical case, the next I-frame (I-frame 410) occurs 500 ms from the I-frame 408. If the only available stream was the instance 402A, then a subscriber terminal requesting the channel change would have to wait until the occurrence of the I-frame 410 before synchronizing to the content. That is, the subscriber terminal would not synchronize to the instance 402A until time t2. However, the channel change event occurs before I-frame 412 in the instance 402B. The I-frame 412 occurs before the I-frame 410 in the instance 402A. The subscriber terminal requesting the channel change can synchronize to the content at a time t1, which is before the time t2. In this case, the selection element 204 would select instance 402B for delivery to the subscriber terminal, rather than the instance 402A.

The selection element 204 transmits each selected instance towards the requesting subscriber terminal in a channel. In one embodiment, if a given channel is not carrying the primary instance of a content stream, the selection element 204 switches the primary instance into a channel at the next reference frame after the initial time of the channel change event. Referring to FIG. 3, consider the instance 302A as being the primary instance. If the instance 302B is currently being transmitted to a subscriber terminal, the instance 302A may be switched into the channel at an I-frame 350, before the occurrence of the frame 352 in the instance 302B. If the instance 302C is currently being transmitted to the subscriber terminal, the instance 302A may be switched into the channel at the I-frame 350, before the occurrence of the frame 354 in the instance 302C. In the embodiment where the instances compress successively delayed versions of the content stream, it is preferred not to switch to the primary instance, since this would cause some content to be lost or repeated.

Figure 5:
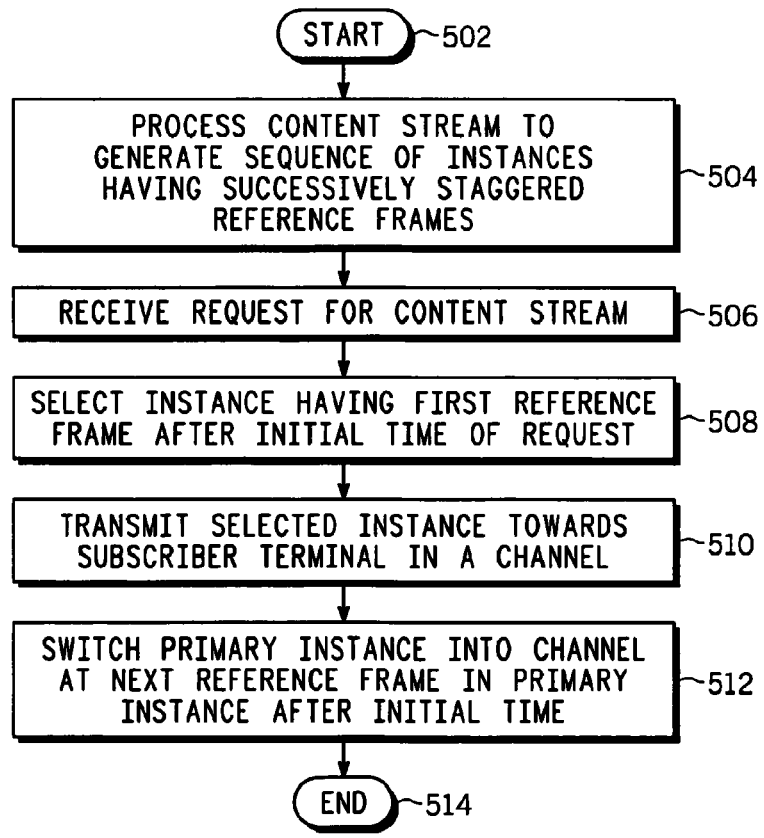
FIG. 5 is a flow diagram depicting an exemplary embodiment of a method for distributing a content stream from a headend to a subscriber terminal in accordance with one or more aspects of the invention.

FIG. 5 is a flow diagram depicting an exemplary embodiment of a method 500 for distributing a content stream from a headend to a subscriber terminal in accordance with one or more aspects of the invention. The method 500 begins at step 502. At step 504, the content stream is processed to generate a sequence of instances having successively staggered reference frames. The sequence of instances includes a primary instance. At step 506, a request for the content stream is received from the subscriber terminal at an initial time. At step 508, an instance is selected from the sequence having the first reference frame after the initial time. That is, the instance having the shortest delay between the initial time and a reference frame is selected. At step 510, the selected instance is transmitted towards the subscriber terminal in a channel. At step 512, the primary instance is switched into the channel at the next reference frame in the primary instance that occurs after the initial time. The method 500 ends at step 514. The method 500 may be repeated various requests of various content streams.

Figure 6:
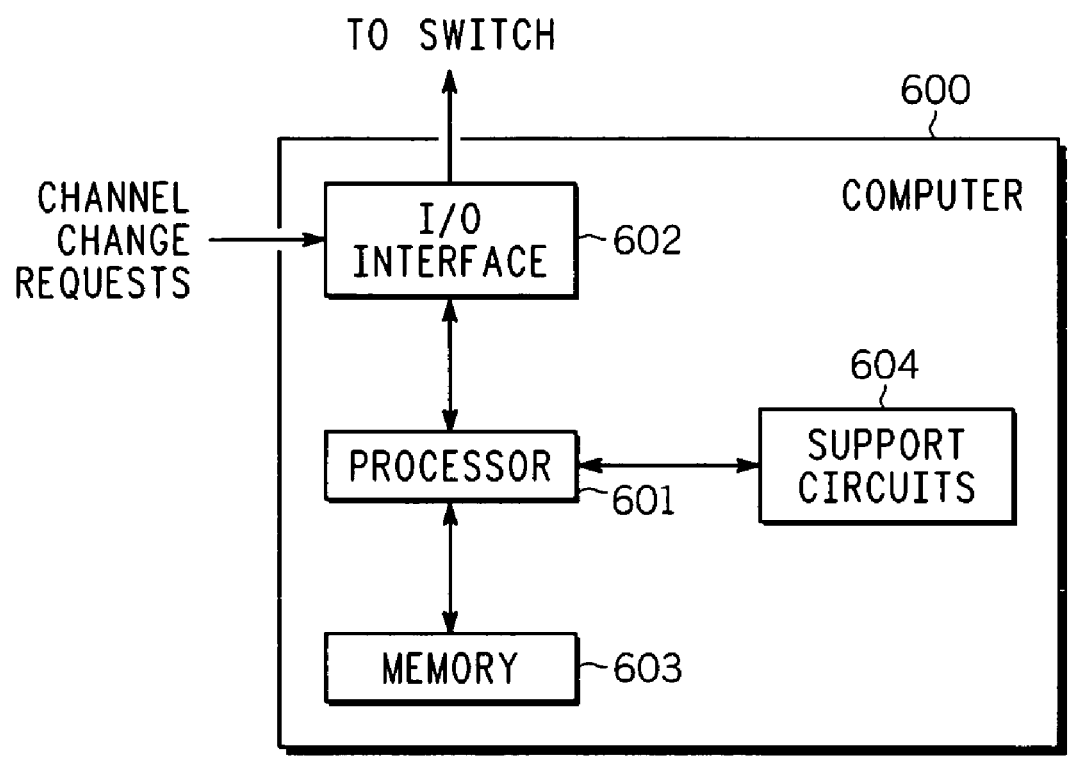
FIG. 6 is a block diagram depicting an exemplary embodiment of a computer suitable for implementing a controller in accordance with one or more aspects of the invention.

FIG. 6 is a block diagram depicting an exemplary embodiment of a computer 600 suitable for implementing the controller 205 of FIG. 2. The computer 600 includes a processor 601, a memory 603, various support circuits 604, and an I/O interface 602. The processor 601 may be any type of microprocessor known in the art. The support circuits 604 for the processor 601 include conventional cache, power supplies, clock circuits, data registers, I/O interfaces, and the like. The I/O interface 602 may be directly coupled to the memory 603 or coupled through the processor 601. The I/O interface 602 is coupled to the switch 203 and is configured to receive channel change requests. The control function of the computer 600 may be implemented using software, hardware, or a combination of software and hardware. Such implementations may include a number of processors independently executing various programs and dedicated hardware, such as ASICs.

While the foregoing is directed to illustrative embodiments of the present invention, other and further embodiments of the invention may be devised without departing from the basic scope thereof, and the scope thereof is determined by the claims that follow.

What is claimed is:

1. A method of distributing a content stream from a headend to a subscriber terminal, comprising:
   processing the content stream at the headend to generate a sequence of instances having successively staggered reference frames;
   receiving a request for the content stream from the subscriber terminal at an initial time;
   selecting, in response to the request, an instance from the sequence of instances having the first reference frame after the initial time; and
   transmitting the instance in a channel towards the subscriber terminal.

2. The method of claim 1, wherein the sequence of instances includes a primary instance, and the method further comprises:
   switching the primary instance into the channel at a next reference frame in the primary instance after the initial time.

3. The method of claim 2, wherein the step of processing comprises:
   passing the content stream as the primary instance; and
   replacing non-reference frame in the content stream with a reference frame for each remaining instance in the sequence of instances.

4. The method of claim 3, wherein the step of replacing is performed in the compressed domain.

5. The method of claim 2, wherein the step of processing comprises:
   passing the content stream as the primary instance; and
   successively delaying the content stream to produce each remaining instance in the sequence of instances.

6. The method of claim 1, wherein the request is indicative of a change from an initial content stream being received by the subscriber terminal from the headend to the content stream.

7. The method of claim 1, wherein the channel is implemented in a switched digital video (SDV) network.

8. A content distribution system, comprising:
   a subscriber terminal configured to request a content stream at an initial time;
   a headend having a processor for processing the content stream to generate a sequence of instances having successively staggered reference frames; and
   a switch element for receiving the request for the content stream from the subscriber terminal and selecting, in response to the request, an instance from the sequence of instances having the first reference frame after the initial time; and
   a transport system for transmitting the instance in a channel towards the subscriber terminal.

9. The system of claim 8, wherein the sequence of instances includes a primary instance, and the switch element is configured to switch the primary instance into the channel at a next reference frame in the primary instance after the initial time.

10. The system of claim 9, wherein the processor is configured to:
    pass the content stream as the primary instance; and
    replace a non-reference frame in the content stream with a reference frame for each remaining instance in the sequence of instances.

11. The system of claim 10, wherein the processor is a compressed domain processor.

12. The system of claim 9, wherein the processor is configured to:
    pass the content stream as the primary instance; and
    successively delay the content stream to produce each remaining instance in the sequence of instances.

13. The system of claim 8, wherein the request is indicative of a change from an initial content stream being received by the subscriber terminal from the headend to the content stream.

14. The system of claim 8, wherein the transport system comprises a switched digital video (SDV) network.

15. Apparatus for distributing a content stream from a headend to a subscriber terminal, comprising:
    means for processing the content stream at the headend to generate a sequence of instances having successively staggered reference frames;
    means for receiving a request for the content stream from the subscriber terminal at an initial time;
    means for selecting, in response to the request, an instance from the sequence of instances having the first reference frame after the initial time; and
    means for transmitting the instance in a channel towards the subscriber terminal.

16. The apparatus of claim 15, wherein the sequence of instances includes a primary instance, and the apparatus further comprises:
    means for switching the primary instance into the channel at a next reference frame in the primary instance after the initial time.

17. The apparatus of claim 16, wherein the means for processing comprises:
    means for passing the content stream as the primary instance; and
    means for replacing a nonreference frame in the content stream with a reference frame for each remaining instance in the sequence of instances.

18. The apparatus of claim 15, wherein the means for processing comprises:
    means for passing the content stream as the primary instance; and
    means for successively delaying the content stream to produce each remaining instance in the sequence of instances.

19. The apparatus of claim 15 wherein the request is indicative of a change from an initial content stream being received by the subscriber terminal from the headend to the content stream.

20. The apparatus of claim 15, further comprising a switched digital video network for implementing the channel.

* * * * *